United States Patent [19]

Ross et al.

[11] 4,428,028

[45] Jan. 24, 1984

[54] ELECTROLYTIC CAPACITOR

[75] Inventors: Sidney D. Ross; Franz S. Dunkl, both of Williamstown, Mass.

[73] Assignee: Sprague Electric Company, North Adams, Mass.

[21] Appl. No.: 320,637

[22] Filed: Nov. 12, 1981

Related U.S. Application Data

[63] Continuation-in-part of Ser. No. 774,010, Mar. 3, 1977, abandoned.

[51] Int. Cl.$^3$ ............................................. H01G 9/02
[52] U.S. Cl. .................................... 361/433; 252/62.2
[58] Field of Search ........................ 252/62.2; 361/433

[56] References Cited

U.S. PATENT DOCUMENTS 2,934,682  4/1960  Schwarz et al. .................... 317/230
3,138,746  6/1964  Burger et al. ....................... 317/230
3,403,305  9/1968  Santway et al. ................ 252/62.2 X
3,546,119 12/1970  Chesnot .......................... 252/62.2 X
4,189,761  2/1980  Finkelstein et al. ............ 252/62.2 X

OTHER PUBLICATIONS

M. Finkelstein et al, "Preparation and Anodic Peak Potentials of Salts of Coordination Compounds Derived from Boric Acid and Polyhydric Phenols", J. Org. Chem. 40:804-5, (1975).

Primary Examiner—Jack Cooper

[57] ABSTRACT

An aluminum or tantalum electrolytic capacitor contains an electrolyte system utilizing 3-methoxypropionitrile as solvent. This system includes a stable solute chosen from amine-glycol-borates, condensed phosphates, and complex boro-phenolates to provide a system having a room-temperature resistivity of up to 1000 ohm-cm.

1 Claim, 1 Drawing Figure

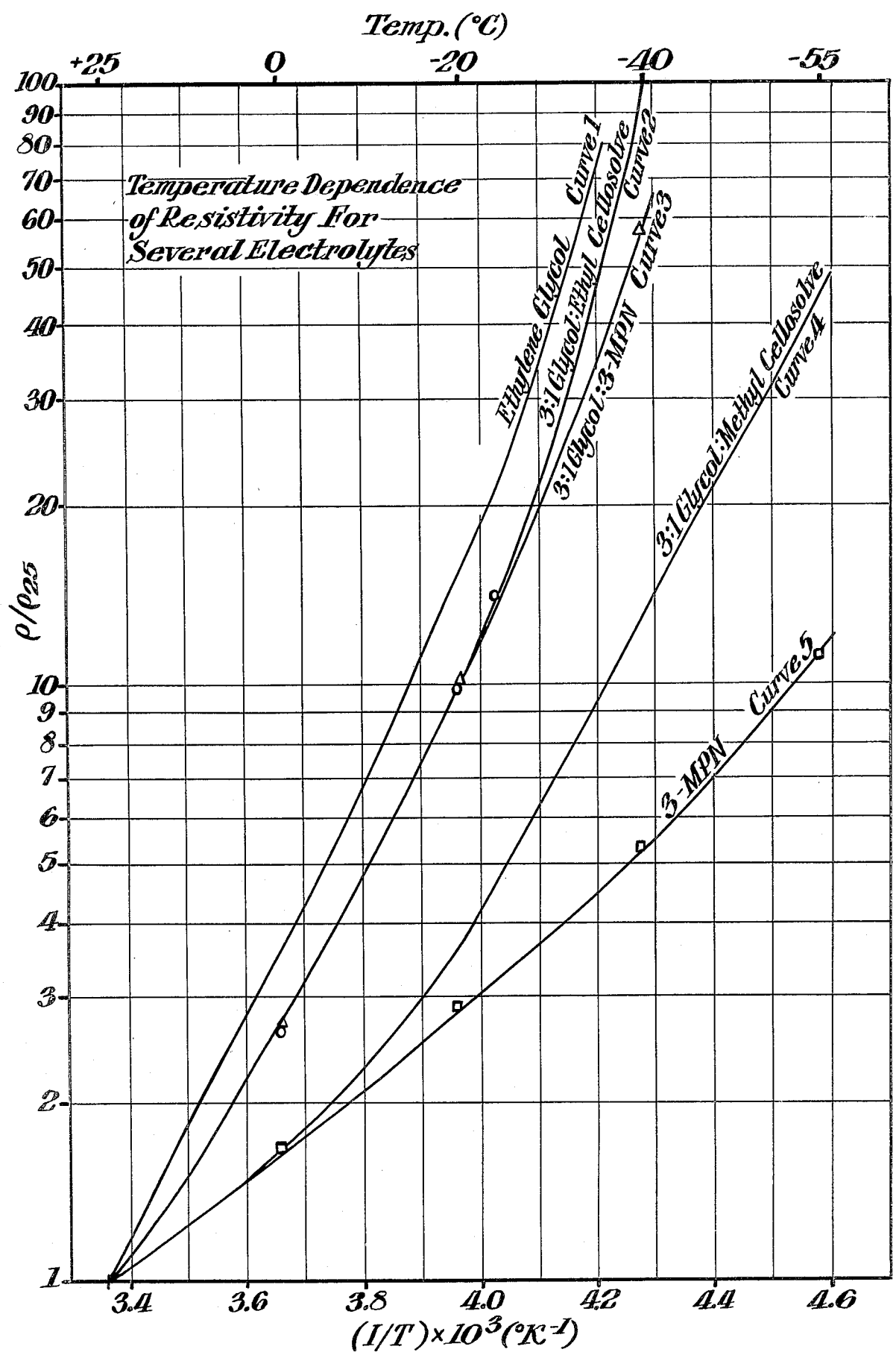

ELECTROLYTIC CAPACITOR

CROSS REFERENCE TO RELATED APPLICATION

This application is a continuation-in-part of application Ser. No. 774,010, filed Mar. 3, 1977, now abandoned.

BACKGROUND OF THE INVENTION

This invention relates to an electrolyte for an electrolytic capacitor, and more particularly to an electrolyte system including 3-methoxypropionitrile as a solvent.

Electrolytes for electrolytic capacitors should be usable through a wide range of temperatures so as to provide satisfactory performance in either high or low temperature capacitor applications. It is desirable to use an electrolyte system that will form and maintain a dielectric oxide film on aluminum or tantalum foil to at least several hundred volts. Suitable electrolyte solvents must have a reasonably high dielectric constant, low viscosity, and be inert to chemical reaction. These requirements establish the solvent of the solvent of the electrolyte system as being an important factor in attaining desirable capacitor results.

Dimethylformamide (DMF) has for years been a proven solvent in electrolyte systems for electrolytic capacitors. However, the need continues for improved electrolyte systems having greater operating ranges and particularly good low temperature behavior.

It is an object of this invention to provide an electrolyte system having a maximum formation voltage for a dielectric oxide in the 300 to 500 V range together with a room temperature resistivity of substantially less than 1000 ohm-cm.

SUMMARY OF THE INVENTION

An electrolytic capacitor contains an aluminum or tantalum anode immersed in an electrolyte system having stable solute in a solvent comprised of 3-methoxypropionitrile (hereinafter referred to as 3-MPN). This 3-MPN electrolyte has valuable resistivity characteristics over a wide range of operational temperatures and produces ("forms") a dielectric oxide film on the anode at $V_{max}$ voltages of as high as about 500 volts.

The electrolyte system of this invention effectively includes a stable solute which is not reduced by cathodic reaction. This combination of 3-MPN and a stable solute is particularly advantageous at the low end of the operating temperature range. It has been discovered that borate solutes in solvents wholly or partially of 3-MPN provide an electrolyte system exhibiting superior properties when substituted for DMF based systems in aluminum or tantalum electrolytic capacitors.

A feature of the electrolyte system of this invention is the combination of the properties of low resistivity when operating at temperature below $-20°$ C. and supporting anodization at voltages as high as 300 to 500 volts.

Further, the electrolyte system of this invention having 3-MPN as a sole or mixed solvent is compatible with conventional electrolytic capacitor spacer materials and sealing materials.

It has been discovered that electrolytes of this invention having solvents wholly or partially of 3-MPN provide a suitable maximum voltage for anodization of capacitor foil and resistivities of less than 1000 ohm-cm, while being compatible with such conventional spacer materials. Electrolytes made with 3-MPN as a solvent can support anodization to several hundred volts while maintaining low resistivity at as low as $-55°$ C.

The 3-MPN electrolytes of this invention utilize various stable solutes other than the preferred borates, e.g., condensed phosphates. The maximum anodization voltage is determined by anodizing an aluminum foil anode. The upper limit to which the anodizing voltage can be raised at constant current is referred to as the maximum formation voltage ($V_{max}$).

BRIEF DESCRIPTION OF THE DRAWING

The sole FIGURE is a graph comparing the temperature-resistivity characteristics of electrolyte systems of the present invention with well established prior art electrolytes. In the graph the vertical axis represents the ratio of resistivity over a range of temperatures to resistivity at 25° C. The horizontal axis represent the temperature in degrees Celsius and the reciprocal temperature in degrees Kelvin.

DESCRIPTION OF THE PREFERRED EMBODIMENTS

The materials of this invention were constructed into a rolled aluminum foil capacitor containing appropriate spacer materials and an electrolyte according to this invention. The following examples of this invention relate to specific embodiments thereof and are set forth for the purpose of illustration only and are not intended to be limitative.

A 0.05 M solution of diisopropylammonium boro-di-2,2'-dihydroxybiphenyl

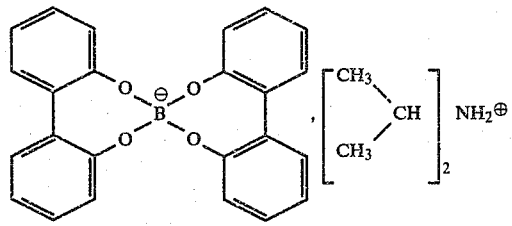

in 3-MPN had a resistivity of 930 ohm-cm at 25° C. and allowed formation of aluminum foil up to 385 V at 25° C. and to 320 V at 125° C. using a current density of 1 mA/cm$^2$.

As an example of a condensed glycol-borate system, an electrolyte was prepared by dissolving 6.96 g tributylamine, 6.33 g glycol, and 12.66 boric acid in 100 g 3-MPN, producing an amine-glycol-borate solute dissolved in 3-MPN. This solution had a resistivity of 870 ohm-cm at 25° C., and was used to form aluminum foil with a current density of 1 mA/cm$^2$. Clean formations with high current efficiency were obtained up to 510 V at 25° C. and up to 460 V at 125° C.

Six capacitors made with this electrolyte had an average capacity of 76 $\mu$F and a leakage current of 22 to 30 $\mu$A at 350 V.

The preparation of the condensed phosphate solutes used in the present invention is described in U.S. Pat. No. 2,934,682 (Schwarz et al.). A solution of 42.6 g of tris(triethylammonium) trimethyltetraphosphate dissolved in 108 g 3-MPN had a resistivity of 571 ohm-cm at 25° and allowed formation of aluminum foil up to 330 V using a current density of 1 mA/cm$^2$.

It is also desirable to use 3-MPN as part of a mixed solvent system since it is less volatile than either methyl or ethyl cellosolve.

Mixtures of the 3-MPN solvent with other solvents were prepared. The mixtures were compared with other solvent systems, and the compared systems tested for resistivity change with temperature. The test results for the solvents are plotted as curves on the accompanying figure of the drawing, wherein:

Curve 1 represents a standard ethylene glycolammonium pentaborate electrolyte;

Curve 2 represents a 3:1 mixture of ethylene glycol and ethyl cellosolve;

Curve 3 represents a 3:1 mixture of ethylene glycol and 3-MPN;

Curve 4 represents a 3:1 mixture of ethylene glycol and methyl cellosolve; and

Curve 5 represents 3-MPN

In order to directly compare resistivity-temperature data, the same solute, sodium formate, was used in Curves 2 through 5 so that no variations caused by solute differences would be introduced. The low temperature properties are affected mainly by solvent viscosity, and thus will hold when using the solutes of the present invention.

In the FIGURE the vertical axis represents the ratio of resistivity at a range of temperatures to the resistivity of 25° C. The horizontal axis represents the temperature in Celsius and inverse Kelvin scales. The FIGURE shows the advantageous low temperature characteristics of an electrolyte with 3-MPN.

As the FIGURE shows, electrolytes with 3-MPN as the sole solvent have excellent −55° C. properties while those using a mixture of glycol and 3-MPN have better −° C. properties than glycol alone or a glycol-ethyl Cellosolve mixture. To obtain lower temperature operation, more 3-MPN and less glycol would be used or 3-MPN would be used with a solvent other than glycol.

The preferred solutes of the present invention include the condensed phosphates, as exemplified by tris-(triethylammonium) trimethyltetraphosphate, as opposed to simple phosphates, e.g., phosphoric acid, ammonium phosphate, etc. Also included are the condensed glycol-borate solutes obtained from an amine, boric acid or simple borate salt, and ethylene glycol, frequently by simple mixing or heating to solution. The condensed glycol borate is a condensation polymer formed by esterifying boric acid by glycol, and the solute above is this condensation product partially neutralized by tributylamine. The complex boro-phenolate salts are exemplified by the boro-di-dihydroxybiphenyls. The preparation of such complex borate salts has been previously described as shown by the article "Preparation and Anodic Peak Potentials of Salts of Coordination Compounds Derived from Boric Acid and Polyhydric Phenols" by M. Finkelstein et al. in *J. Org. Chem.* 40:804–5 (1975) and by Santway et al. in U.S. Pat. No. 3,403,305, issued Sept. 24, 1968.

When the solute is prepared separately, it is added to the solvent. The resistivity can be varied, within limits, by adding more or less solute. The resistivity desired is determined by the rating of the capacitor and its end use, the solvent, and the amount of solute.

The present invention utilizes electrolytes that are operable over the −55° C. to 125° C. range through the use of one of the solutes dicussed above which are stable over this entire range as well as a solvent or solvent mixture that also is stable over this range. When the capacitor uses aluminum foil, up to 10 wt %, but preferably 2 wt %, of water is added to the electrolyte to aid in reformation of any damaged anodic oxide layer.

What is claimed:

1. An electrolytic capacitor comprising two contiguously wound electrode foils separated by interleaved spacers, at least one of said electrode foils bearing a barrier layer oxide, in contact with an electrolyte consisting essentially of as solvent a member of the group consisting of 3-methoxypropionitrile and mixtures with ethylene glycol, ethylene glycol monomethyl ether, and ethylene glycol monoethyl ether and sufficient solute chosen from the group consisting of tris(triethylammonium) trimethyltetraphosphate, tributylamine salt of glycol-borate, and diisopropylammonium boro-di-2,2′-dihydroxybiphenyl to provide a resistivity at 25° C. of at most 1000 ohm-cm and a maximum formation voltage of 300 to 500 V.

* * * * *